US012124355B2

(12) United States Patent
Wang et al.

(10) Patent No.: US 12,124,355 B2
(45) Date of Patent: Oct. 22, 2024

(54) REMOTE SOFTWARE DEBUGGING METHOD FOR EMBEDDED TERMINALS

(71) Applicant: SOOCHOW UNIVERSITY, Suzhou (CN)

(72) Inventors: Yihuai Wang, Suzhou (CN); Lianmin Shi, Suzhou (CN); Xiaofang Zhang, Suzhou (CN); Wangshu Yao, Suzhou (CN); Qiang Liu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/761,585

(22) PCT Filed: Oct. 9, 2021

(86) PCT No.: PCT/CN2021/122777
§ 371 (c)(1),
(2) Date: Nov. 3, 2022

(87) PCT Pub. No.: WO2022/227410
PCT Pub. Date: Nov. 3, 2022

(65) Prior Publication Data
US 2024/0045788 A1    Feb. 8, 2024

(30) Foreign Application Priority Data

Apr. 29, 2021 (CN) .......................... 202110472347.6

(51) Int. Cl.
*G06F 9/44* (2018.01)
*G06F 9/445* (2018.01)
(Continued)

(52) U.S. Cl.
CPC ........ *G06F 11/362* (2013.01); *G06F 11/3664* (2013.01)

(58) Field of Classification Search
CPC . G06F 11/362; G06F 11/3664; G06F 11/3656
See application file for complete search history.

(56) References Cited

U.S. PATENT DOCUMENTS 6,205,560 B1    3/2001  Hervin
9,158,661 B2 *  10/2015 Blaine ................. G06F 11/3648
(Continued)

FOREIGN PATENT DOCUMENTS

CN        101183330 A    5/2008
CN        103235755 A    8/2013
(Continued)

OTHER PUBLICATIONS

Yuewei Wang, AWEDF: An Architecture-Aware Execution and Debugging Workflow for a Highly, 2017, pp. 1-8. https://ieeexplore.ieee.org/stamp/stamp.jsp?tp=&arnumber=8329097 (Year: 2017).*
(Continued)

*Primary Examiner* — Mongbao Nguyen
(74) *Attorney, Agent, or Firm* — SZDC Law PC (57) ABSTRACT

A remote software debugging method for embedded terminals makes it possible to reduce additional hardware dependencies and storage space occupation based on a CoreSight debugging framework and a dynamic command system. Series communication is used as a lead study to reduce the pre-exploration difficulty of complex communication modules and facilitate subsequent extraction of the commonalities of the communication modules. An FPB (flash patch and breakpoint) unit in CoreSight debugging framework provides a basis for setting and responding to breakpoints, debugging information for the breakpoints can be extracted and output by debug monitoring exceptions, and dynamic commands are used as carriers of overall functions to fulfill rich debugging functions such as starting and exiting of a debugging mode, setting and cancelling of breakpoints and control over program running state. Finally, common ele-
(Continued)

ments of communication modules are extracted, and a general method for adaptive software debugging of communication modules is provided.

9 Claims, 1 Drawing Sheet

(51) Int. Cl.
*G06F 9/455* (2018.01)
*G06F 11/36* (2006.01)

(56) References Cited

U.S. PATENT DOCUMENTS

| | | | | |
|---|---|---|---|---|
| 10,114,732 B2* | 10/2018 | Mankovskii | .......... | G06F 11/362 |
| 10,747,645 B2* | 8/2020 | Myers | ................ | G06F 11/3636 |
| 11,321,107 B1* | 5/2022 | Eyberg | ................ | G06F 9/45545 |
| 2019/0332519 A1* | 10/2019 | Myers | ................ | G06F 11/3093 |
| 2021/0286702 A1* | 9/2021 | Grover | ................ | G06F 11/364 |
| 2021/0303443 A1* | 9/2021 | McConnell | ............. | G06F 21/46 |
| 2022/0083456 A1* | 3/2022 | Le Fur | ................ | G06F 11/3664 |

FOREIGN PATENT DOCUMENTS

| | | | | | |
|---|---|---|---|---|---|
| CN | 105867949 A | | 8/2016 | | |
| CN | 106909480 A | * | 6/2017 | | |
| CN | 108469984 A | * | 8/2018 | ......... | G06F 9/45558 |
| CN | 109800159 A | * | 5/2019 | | |
| CN | 110018965 A | | 7/2019 | | |
| CN | 106462488 B | * | 4/2020 | .......... | G06F 11/3466 |
| CN | 111367742 A | | 7/2020 | | |
| CN | 113111001 A | | 7/2021 | | |
| GB | 2577950 A | * | 4/2020 | ............ | G06F 11/362 |
| WO | WO-2018089278 A1 | * | 5/2018 | .......... | G06F 11/3414 |

OTHER PUBLICATIONS

Leo Yan, Coresight CPU Debug Module, 2017, pp. 1-4. https://docs.kernel.org/trace/coresight/coresight-cpu-debug.html (Year: 2017).*
Alexander Penev, Visual differential debugging in the domain-specific visual programming languages, 2020, pp. 1-6. https://ieeexplore.ieee.org/stamp/stamp.jsp?tp=&arnumber=9311308 (Year: 2020).*
English translation, Zaluski (GB 2577950 A), 2020, pp. 1-12. (Year: 2020).*
English translation, Huang et al. (CN 106909480 A), 2020, pp. 1-9. (Year: 2020).*

* cited by examiner

REMOTE SOFTWARE DEBUGGING METHOD FOR EMBEDDED TERMINALS

This application is the National Stage Application of PCT/CN2021/122777, filed on Oct. 9, 2021, which claims priority to Chinse patent application No. 202110472347.6, filed on Apr. 29, 2021, which is incorporated by reference for all purposes as if fully set forth herein.

BACKGROUND OF THE INVENTION

1. Technical Field

The invention relates to the technical field of software development and debugging, in particular to a remote software debugging method for embedded terminals.

2. Description of Related Art

Traditional embedded terminal development is rarely carried out at the final deployment site. Especially under harsh geographical conditions, it is often difficult for developers to truly simulate all conditions of the final deployment site, so corresponding oversights will be inevitably caused during software development of embedded terminals. In this case, if the remote program updating technology alone is used to update terminal software repeatedly, software problems will be still difficult to locate, and frequent software updating will also bring a load pressure to data transfer, thus creating the need for remote software debugging.

BRIEF SUMMARY OF THE INVENTION

The objective of the invention is fulfilled through the following technical solution.

By analyzing the limitations of traditional debugging methods in the scenario of remote online development of embedded terminals, the invention introduces a CoreSight debugging framework and a dynamic command system to realize remote online debugging of embedded terminal software and reduce additional software dependencies and storage space occupation. Taking serial communication as an example, the specific implementation of software debugging in this mode is detailed, and common elements of communication modules are extracted thereout to provide a general method and functional test for adaptive software debugging of the communication modules.

Specifically, the invention provides a remote software debugging method for embedded terminals, comprising:

Dynamically loading a software debugging program by means of a dynamic command system in a BIOS (basic input/output system) project, and providing a specific implementation of a necessary function for debugging within a dynamic command;

Completing relevant settings of a breakpoint by means of a flash address reloading and breakpoint unit, and outputting corresponding debugging information within a debug monitoring exception responsible for capturing the breakpoint; and Carrying out remote software debugging by means of a full-run mode, a run-by-statement mode, a run-by-process mode and a suspend mode.

Furthermore, the necessary function for debugging includes a debug monitoring exception interrupt processing function.

Furthermore, the remote software debugging method for embedded terminals further comprises:

Sending the dynamic command and a debugging mode enable instruction;
Modifying a User program interrupt vector table; and
Starting a User program.

Furthermore, the remote software debugging method for embedded terminals further comprises: returning the debugging information and exiting from a debugging mode.

Furthermore, completing relevant settings of a breakpoint by means of a flash address reloading and breakpoint unit comprises:

Analyzing an FPB control register;
Analyzing an FPB instruction address compare register;
Setting the breakpoint; and
Cancelling the breakpoint.

Further, the full-run mode comprises:

When a terminal program is stopped, enabling the program to resume running at an upper computer through a full-run instruction until the program encounters a next breakpoint or a suspend instruction;

When the terminal program receives the full-run instruction, modifying the register to enable the debug monitoring exception, and enabling single-step execution; then, determining whether the stop of the current program is triggered by a breakpoint or a suspend instruction; if the stop of the current program is triggered by the breakpoint, disabling the corresponding instruction address compare register, and marking the state of a current debugger; and Allowing the program to resume running to execute an instruction; then, re-entering a debug monitoring exception handler; disabling the single-step execution in conjunction with the state of the current debugger; if the program is previously stopped by the breakpoint, re-enabling the corresponding instruction address compare register until the program encounters a next breakpoint or a suspend instruction.

Further, the run-by-statement mode comprises:

When the current program is suspended, issuing a run-by-statement command by the upper computer, and when a terminal receives the run-by-statement command, enabling the debug monitoring exception and enabling single-step run; if the current program stops at a breakpoint, disabling the current breakpoint, re-entering the debug monitoring exception after the program continues to run one instruction, and disabling the single-step run; and resuming a previously disabled breakpoint if any, and setting a breakpoint at a current program stop position to enable the program stop running and send corresponding register information to the upper computer, such that the upper computer is able to locate a code position corresponding to the current program in combination with a specific address.

Further, the run-by-process mode comprises:

Issuing a run-by-process command by the upper computer, and when a terminal receives the run-by-process command, determining whether an instruction at a current program stop position is a function call instruction; if so, enabling the debug monitoring exception and enabling single-step execution; after the program runs one instruction, namely after the program enters a function to be called, re-entering the debug monitoring exception; setting a breakpoint at a function return address by means of an R14 register of a hardware stack, and then disabling the single-step execution; allowing the program to run at a full speed until the program hits the breakpoint set at the function return address; and after the program hits the breakpoint set at the function return address, sending corresponding register information to the terminal.

Further, the suspend mode comprises:

When a terminal receives a suspend instruction, enabling single-step execution; re-entering the debug monitoring exception after the program continues to run one instruction, and then disabling the single-step execution; and setting an instruction address comparator according to an address of the program that currently triggers the debug monitoring exception, that is, setting a breakpoint at a current position to stop the program.

Further, the remote software debugging method for embedded terminals further comprises:

Sending dynamic command data to a communication module, and writing the dynamic command data by the User program;

Sending a system instruction for program jumping to the communication module, receiving the system instruction by the User program, and jumping to BIOS;

Calling a dynamic command function by default during a BIOS startup process; modifying the running state of the program in the dynamic command first to complete a stay in BIOS; then, completing the initialization and interrupt enable of the communication module; setting an interrupt service routine address, corresponding to the communication module, in the BIOS program interrupt vector table as the dynamic command function; finally, informing the upper computer that relevant initialization has been finished and a program update is to be started; and Sending a relevant instruction for enabling the debugging mode to the communication module by the upper computer to start a formal debug; and exiting from the debugging mode, then resuming interrupt vector tables of all programs, and starting normal execution of the programs.

The Invention has the Following Beneficial Effects:

For the remote debugging technique for software of embedded terminals, the invention makes it possible to reduce additional hardware dependencies and storage space occupation based on a CoreSight debugging framework and a dynamic command system. Also, series communication is used as a lead study to reduce the pre-exploration difficulty of complex communication modules and facilitate subsequent extraction of commonalities of the communication modules. The FPB unit in the CoreSight debugging framework provides a basis for setting and responding to breakpoints, debugging information for the breakpoints can be extracted and output by means of debug monitoring exceptions, and dynamic commands are used as carriers of overall functions to fulfill rich debugging functions such as starting and exiting of the debugging mode, setting and cancelling of the breakpoints and control over the program running state. Finally, common elements of the communication modules are extracted, and a general method for adaptive software debugging of the communication modules is provided.

BRIEF DESCRIPTION OF THE SEVERAL VIEWS OF THE DRAWINGS

Those ordinarily skilled in the art may gain a good understanding of other advantages and beneficial effects of the invention by reading the following detailed description of preferred implementations. The accompanying drawing is merely for the purpose of illustrating these preferred implementations, and is not intended to limit the invention. In the whole accompanying drawing, identical reference signs are used to represent identical components. Wherein.

DETAILED DESCRIPTION OF THE INVENTION

Illustrative implementations of the disclosure will be descried in further detail below with reference to the accompanying drawing. Although the illustrative implementations of the disclosure have been shown in the accompanying drawing, it should be understood that the disclosure may be implemented in different forms and should not be limited by the implementations expounded herein. These implementations are provided to provide a more thorough understanding of the disclosure and to completely convey the scope of the disclosure to those skilled in the art.

In order to reduce additional hardware dependencies, the invention adopts a CoreSight debugging framework. Under this frame, most software debugging operations can be completed in an interrupt service routine of a target terminal in combination with the debugging mode of debug monitoring exceptions and a flash address reloading and breakpoint unit (FPB unit) without the need for additional hardware such as emulators, and only a certain communication mode needs to be selected for up-linking and down-linking of debugging information.

In addition, considering that functional codes for fulfilling software debugging are huge, it is necessary to introduce a dynamic command system to avoid space waste caused by a long-term stay of the functional codes for fulfilling software debugging, and the support requirements of multiple communication modes are met based on dynamic commands.

Design and Implementation of Serial Debugging

Similarly, to ensure that the implementation of software debugging makes it easier to extract common elements of communication modules and makes a finally proposed remote software debugging method more general, the invention adopts a serial communication method and uses serial debugging as a lead study to explore the specific design and implementation.

In a scenario of embedded development, the maximum limitation is the performance of terminal devices, and the storage space is a particularly valuable resource. The function of software debugging is generally not needed anymore when the program of one version becomes stable, temporary functions should not permanently occupy the storage space, so it is inevitable to use dynamic commands to temporarily add the software debug function. Moreover, the core of software debugging is setting, responding and processing of breakpoints, and the CoreSight basic framework proposed by ARM has provided a good solution. The combination of these two makes software debugging based on communication modules become possible. A basic design idea is given below after the application of dynamic command is supplementarily explained.

1 Application of Dynamic Commands and Special Handling of Constants

In a terminal software GEC (graphic editor components) framework proposed by the invention, a software debugging program should be distributed to a BIOS project on the framework level, and a User program is the object of software debugging. Meanwhile, considering the factors such as the space of the software debugging program, a dynamic command mechanism is needed to realize dynamic loading of the software debugging program to reduce the storage space occupied by the BIOS project. In addition, the dynamic command technique also makes the software debugging program easy to update and upgrade, such that the software debugging program can change the transmission mode of debugging information with the change of user communication modules.

Due to the powerful functions of the software debugging program and the frequent update of the software debugging program for different communication modes, it will be difficult to upgrade the version of the software debugging program if dynamic commands still excessively depend on the function of an original project. In view of this, when the software debugging program is written by means of dynamic commands, in addition to using a dynamic component library to solidify complex functions into a component function code zone to facilitate calling, it is also necessary to release restrictions on the use of special constants and to link the constants in the dynamic commands to the storage space of a dynamic command zone by limiting the .text and .rodata segments of the dynamic commands to the dynamic command zone in a link file.

2 Basic Design Idea

The basic design idea of serial debugging under GEC is as follows:
(1) Dynamic loading of a software debugging program is realized by means of a dynamic command system in a BIOS project, and a specific implementation of a necessary function for debugging such as a debug monitoring exception interrupt handling function is provided within a dynamic command.
(2) Relevant settings of a breakpoint are completed by means of an FPB unit, and corresponding debugging information is output within a debug monitoring exception responsible for capturing the breakpoint.
(3) Specific meanings of a full-run mode, a run-by-statement mode, a run-by-process mode and a suspend mode are analyzed, and the design of the FPB and the debug monitoring exception is refined.

Next, the implementation of serial debugging is expounded with an ARM Cortex-M4 processor as an example mainly from the aspects of starting and exiting of a debugging mode, setting and cancelling of breakpoints, and running and suspending of programs.

3 Starting and Exiting of the Debugging Mode

A detailed starting process of the debugging mode will be given below, and necessary preparations for entering the debugging mode and a detailed description thereof will be provided in the aspects of reserving RAM space and processing debugging information.

1. Process for Starting the Debugging Mode

To carry out software debugging, a program needs to be stopped to be in a state where it waits for a debugging instruction first. A common handling method is to stop the target program at a main function entry, which is at the main function entry of a User program under the GEC framework. The starting process of the debugging mode will be described in detail below.
(1) A dynamic command and a debugging mode enable instruction are sent. First, a dynamic command function packet is sent to a target terminal. Considering the powerful serial debugging functions, for the sake of a good understanding, corresponding dynamic command contents will be described in different serial debugging functions respectively. After the dynamic command is sent and installed, a 1st file obtained after the User program is compiled is analyzed, and corresponding information is sent; the debugging mode enable instruction containing an address of the main function entry of the User program is sent, and soft reset is carried out to enable the program to return to the BIOS program to run.
(2) A User program interrupt vector table is modified. A dynamic command function is called in the BIOS program; in the User program interrupt vector table, a 12 #debug monitoring exception vector is modified to point to a debug monitoring exception service routine compiled in the dynamic command, a 1 #reset vector is modified to point to a reset function compiled in the dynamic command, an address where a breakpoint is to be set is stored in an idle 8 #vector, and a reset vector originally used for the User program is stored in an idle 7 #vector. In this way, the starting process of the User program is intervened, and an interrupt service routine address for the debug monitoring exception is set.

It should be noted that the original 1 #reset vector points to the main function of the reset function: a first 32-bit instruction of the reset function is used to assign a value to main stack pointer (which is generally the maximum value of an available RAM), and then operations such as clearing data in a bss segment, copying data in a data segment, initializing a system clock, disabling a watchdog, initializing a library function, and starting a main function are performed.
(3) The User program is started. BIOS guides the User program to start to execute the function pointed by the reset vector; however, since the interrupt vector table of the User program has been modified, the original reset vector points to a newly written reset function in the dynamic command. The new reset function assigns a different value to the main stack pointer by subtracting 256 bytes from the original maximum address of the available RAM space to hold key debugging information. Operations relating to initial debugging, mainly including clearing all breakpoint registers, enabling FPB, enabling the debug monitoring exception, analyzing and modifying the address at a preset breakpoint (namely, the address of the main function entry of the User program) and setting the breakpoint, are performed.

Then, a new function pointer, which is shifted backward by 4 bytes from the original reset function entry address, is created to skip the original main stack pointer assignment. Finally, this function pointer is called to complete the remainder of user program initialization and to guide the subsequent program run. When the user program runs to the breakpoint (namely, address of the main function entry of the User program), a hardware interrupt is triggered to enter the debug monitoring exception, and a register stack of necessary debugging information is stored in a reserved 256-byte space and is then sent back to the upper computer in a unified manner. At this point, the program is suspended and waits for a next instruction from the upper computer.

2. Use of the Reserved RAM Space

As can be seen from the previous description, when entering the debugging mode, the value assigned to the main stack pointer of the user program will be adjusted by subtracting 256 bytes from the maximum value of the original RAM space. In other words, in the debugging mode, the size of the RAM space available to the user program is reduced by 256 bytes, which is mainly used for storing some necessary debugging information. The allocation of the reserved RAM space is shown in Table 4-1.

TABLE 4-1

Allocation of the reserved RAM space

| Variable | Length (bytes) | Remarks |
|---|---|---|
| registsp | 4 | Storage address of debugging information to be sent back |
| Debug_statu | 1 | Debug state |
| BPindex | 4 | Serial number of instruction comparator for current interrupt |
| BPRegist | 4 | Contents of instruction comparator for current interrupt |
| dsabledRegists | 4 | Recorder of addresses disabled running in the middle of target-address command and process-by-process command, recorded by bits |
| runToAddress | 4 | Run target address |
| currCommand | 1 | Current command |
| isFunctionExec | 1 | Number of function executions |
| remainCallNumber | 4 | Remaining function call instructions |
| instructionAddressTable | 80 | Instruction address |
| sendFram | 101 | Tips to be sent back |

3. Return of Debugging Information

Debugging information returned to a PC mainly comes from different registers in an MCU, one part of these registers are stack frames, and the other part of these registers are obtained by manually pushing in the debug monitoring exception. Wherein, the stack frames are data blocks that are pushed into a stack space at an entry of the exception. For a Cortex-M3 processor, or a Cortex-M4 processor without a floating-point unit, the stack frames have a size of 8 words, while for a Cortex-M4 with a floating-point unit, the stack frames may have a size of 8 or 26 words. Here, the distribution of registers in the RAM after a chip enters the debug monitoring exception interrupt handler is specifically expounded with the size of the stack frames being 8 words as an example.

When the user program runs to the set breakpoint and triggers a hardware interrupt, the debug monitoring exception interrupt service routine will be started. Before a specific program function is executed, hardware pushing will be performed to automatically push eight registers (namely stack frames), R0, R1, R2, R3, R12, R14, R15 (PC) and PSR, into the stack space by hardware. In order to enrich the debugging information, some additional register information needs to be returned to the PC, so within the debug monitor exception, a stack top before hardware pushing, three interrupt mask registers R4~R11, and reserved machine codes and frame numbers (which are all zero initially) are pushed into the stack space in turn, and final sp is stored in the last one of 256 bytes let out of the RAM space of the user program, namely registsp in Table 4-1. A C function is then called to retrieve a specific machine code at the breakpoint, mainly with the aid of the an R15 register for a hardware stack, as the R15 register stores the program address before entering the interrupt, so the specific machine code can be obtained by taking the value of the R15 register as address contents. The main stack space distribution after entry into the debug monitor exception is shown in Table 4-2.

TABLE 4-2

Stack space distribution after entry into the debug monitor exception

| Contents (from high address) | Remarks |
|---|---|
| Reserved RAM space | Reserved by debugger, see Table 4-1 for details |
| Initial stack top of user program RAM used during program run and before debug monitoring exception is triggered, length unknown | Assume that the stack top at the moment before the debug monitoring exception is triggered is SP1 |
| xPSR, R15 (PC), R14 (LR), R12, R3-R0 | Trigger debug monitoring exception, hardware stack |
| xPSR, R15 (PC), R14 (LR), R12, R3-R0 | |
| LR | Manual pushing after entry into debug monitoring exception |
| R0 = current SP + 36 (namely SP1) | Manual stack, eight hardware stacks, LR for one manual stack Total 36 bytes shifted |
| R1 = PRIMASK, R2 = FAULTMASK, R3 = BASEPRI | Manual stack, interrupt mask register |
| R4-R11 | Manual stack |
| R0 = 0 | Manual stack, reserved storage instruction code |
| R0 = 0 | Manual stack, reserved storage frame number |

The start address provided via registsp is then used as the start address of a return data frame, the structure type of the return data frame is shown in Table 4-3, corresponding to Table 4-2 from low addresses onwards.

TABLE 4-3

Composition of structure RegistS1

| Members | Remarks |
|---|---|
| uint_32 framNum | Frame number |
| uint_32 instruction | Instruction code, obtained from R15 (PC) |
| uint_32 R11-R4 | |
| uint_32 basepri | |
| uint_32 faultmask | |
| uint_32 primask | |
| uint_32 R13 | SP1 |
| uint_32 LR | |
| uint_32 R0-R3 | |
| uint_32 R12 | |
| uint_32 R14 | |
| uint_32 R15 | PC |
| uint_32 xPSR | |

4. Exiting of the Debugging Mode

The steps for exiting from the debugging mode are relatively simple. After the upper computer selects the exit of the debugging mode, a debugging mode exit instruction will be sent to a serial port of the terminal, and after receiving the debugging mode exit instruction, the terminal will enter the dynamic command to give a response, and clear all breakpoints, disable debugging and restart.

When the reset function within the dynamic command is executed in the user program, the reset function will make a judgment on the current debug state, and when it is found that debugging is disabled, the interrupt vector table of the user program will be restored to the initial state, and then the original reset vector of the user program will be executed normally. At this point, the debugging mode is completely disabled and the value assigned to the stack top of the user program is restored to the maximum value of the RAM space, and normal execution begins.

4 Setting and Cancelling of Breakpoints

Breakpoints are an important part of a debugger and are used to inform the debugger to suspend a program at a specific position.

1. Analysis of FPB Control Register

The breakpoint function provided by FPB is mainly used here. Registers on which the breakpoint function relies are mainly FPB control registers and FPB instruction address compare registers. The FPB control registers (FPB→CTRL) are mainly used to enable the FPB unit, and the specific structure of the FPB→CTRL registers is shown in Table 4-4.

TABLE 4-4

Structure of FPB -> CTRL register

| Data bit | Type | Function |
| --- | --- | --- |
| D31~D15 | — | Reserved |
| D14~D12 | Read only | High valid bits of the number of instruction address compare registers |
| D11~D8 | Read only | The number of text address compare registers |
| D7~D4 | Read only | Low valid bits of the number of instruction address compare registers |
| D3~D2 | — | Reserved |
| D1 | Read only | Any write operation to this register will be ignored unless this bit is 1 |
| D0 | Read only | FPB enable bit, set 1 to enable, set 0 to disable |

Therefore, the prerequisite for using the breakpoint function is to set two low positions of FPB→CTRL to 1, which is implemented when debugging is started.

2. Analysis of FPB Instruction Address Comparison Register

Due to the limitation of the number of hardware comparators, there are at most six comparators capable of generating instruction address breakpoints (FPB→COMP[0]~FPB→COMP[5]) in Cortex-M3 and Cortex-M4. Moreover, software debugging based on communication modules is essentially done with the aid of debug monitor exceptions, so the debugging program introduced in the invention does not support breakpoint setting when a general interrupt is closed and within other interrupt service routines.

When a breakpoint is set at a legal program, the upper computer first resolves an instruction address of a corresponding statement and sends the information of the address, where the breakpoint is to be set, to the terminal, which then resolves the address after receiving the information and subsequently assigns a value to the instruction address compare register. The structure of the instruction address compare register is shown in Table 4-5.

TABLE 4-5

Structure of FPB-COMP[n] register

| Data bit | Function |
| --- | --- |
| D31~D30 | 00: remap to remap address; 01: set breakpoint at address below half-word 10: set breakpoint at address above half-word; 11: set breakpoint at high/low half-word addresses |
| D29 | Reserved |
| D28~D2 | Bits from 2 to 29 of address to be compared with address in code storage area Remaining bits 0, 1, 29, 30 and 31 are zero |
| D1 | Reserved |
| D0 | Enable bit of instruction address compare register, set 1 to enable, set 0 to disable |

The structure of the instruction address compare register shows that breakpoints cannot be set at any address, but only at half-word addresses, that is, breakpoints are set every two bytes from the smallest address. This is because the addresses recorded in the instruction address compare register are represented by bits, from 2 to 28, of a 32-bit address, which can represent up to 29 bits of an address space, which meets the maximum address range in Cortex-M3 and Cortex-M4, and all the addresses represented are multiples of 4, which means that all the addresses are whole-word addresses. In addition, two high bits of the instruction address compare register indicate that a breakpoint is set at an address below or above half-word of a current whole-word address or breakpoints are set at an address below or above half-word of the current whole-word address, it thus can be seen that the addresses that support breakpoint setting are all half-word addresses from the start address. Therefore, under the condition of up to six instruction compare registers, breakpoints can be set in the vicinity of six full-word addresses, and in an extreme case, up to twelve breakpoints can be set at addresses half-word below and above the full-word addresses of each instruction address compare register.

3. The Process of Setting Breakpoints

When receiving the address, where a breakpoint is to be set, from the upper computer, the terminal will first determine whether a breakpoint already exists at this address; if so, the terminal will feed corresponding information back to the upper computer; if not, the terminal will determine whether upper and lower half-word addresses, namely target addresses, exist in an existing breakpoint; if so, two high bits of the corresponding instruction address compare register will be modified to 1, so that breakpoints will be set at the upper and lower half-word addresses of the current whole-word address; if there is no breakpoint that meets the condition, whether the instruction address compare register has a vacant space is determined; if not, the information that no more breakpoint can be set until some existing breakpoints are cleared will be fed back to the upper computer; if there is still a vacant space, the instruction address compare register will be set according to a preset address to enable a first lowest position, two high registers will be set according to whether the address itself is in the high half-word or low half-word, and bits 2 to 28 will be copied to corresponding locations of the register.

4. Cancelling of Breakpoints

The steps for cancelling breakpoints are relatively simple. For an instruction address compare register with breakpoints being set at both upper and lower half-word addresses of a full-word address, the breakpoints set at the corresponding half-word addresses will be removed. Specifically, if a breakpoint set at a low half-word address is to be cancelled, two high bits of the corresponding instruction address compare register will be set to "set breakpoint at address below half-word"; if a breakpoint at a high half-word address is to be cancelled, two high bits of the corresponding instruction address compare register will be set to "set breakpoint at address above half-word". For those instruction address compare registers where breakpoints are not set at upper and lower half-word addresses, the lowest enable bit will be cleared to 0.

5 Running and Suspending of the Program

Program run instructions in the debugger are generally divided into full-run, run-by-statement, run-by-process and suspending. The concepts of full-run and suspending are relatively simple, and the difference between run-by-statement and run-by-process will be explained here: if there is a function call at the position where the current program stops, in the run-by-statement mode, the program will enter this function when running next time, while in the run-by-process mode, the program will skip this function when running next time.

1. Full-Run

When the terminal program is stopped, the program can be resumed to the full-run state at the upper computer by means of a full-run instruction until the program encounters a next breakpoint or a suspend instruction.

After receiving the full-run instruction, the terminal program will modify the CoreDebug→DEMCR register to enable a debug monitoring exception and enable single-step execution. Then, whether the stop of the current program is triggered by a breakpoint or by a suspend instruction will be determined; if the stop of the current program is triggered by the breakpoint, the corresponding instruction address compare register will be also disabled, and the current state of the debugger will be marked with a special marker. The structure of the CoreDebug→DEMCR register is shown in Table 4-6.

TABLE 4-6

Structure of CoreDebug −> DEMCR register

| Data bit | Function |
| --- | --- |
| D31~D25 | Reserved |
| D24 | Enable all DWT and ITM functions |
| D23~D20 | Reserved |
| D19 | Debug monitoring signal bit |
| D18 | Enable single-step execution, set 1 to enable, set 0 to disable |
| D17 | Set or clear the suspended state of debug monitoring exception, set 1 to suspend, set 0 to clear |
| D16 | Enable debug monitoring exception, set 1 to enable, set 0 to disable |
| D15~D11 | Reserved |
| D10 | Debugger stop enable bit in case of hardware fault exception, set 1 to enable, set 0 to disable |
| D9 | Debugger stop enable bit in case of input or return error exception, set 1 to enable, set 0 to disable |
| D8 | Debugger stop enable bit in case of bus error exception, set 1 to enable, set 0 to disable |
| D7 | Debugger stop enable bit in case of UsageFault caused by state information error, set 1 to enable, set 0 to disable |
| D6 | Debugger stop enable bit in case of UsageFault caused by check error, set 1 to enable, set 0 to disable |
| D5 | Debugger stop enable bit in case of UsageFault caused by access protocol processor, set 1 to enable, set 0 to disable |
| D4 | Debugger stop enable bit in case of MemManage exception, set 1 to enable, set 0 to disable |
| D3~D1 | Reserved |
| D0 | Reset vector capture enable bit, set 1 to enable, set 0 to disable |

Figure 1:
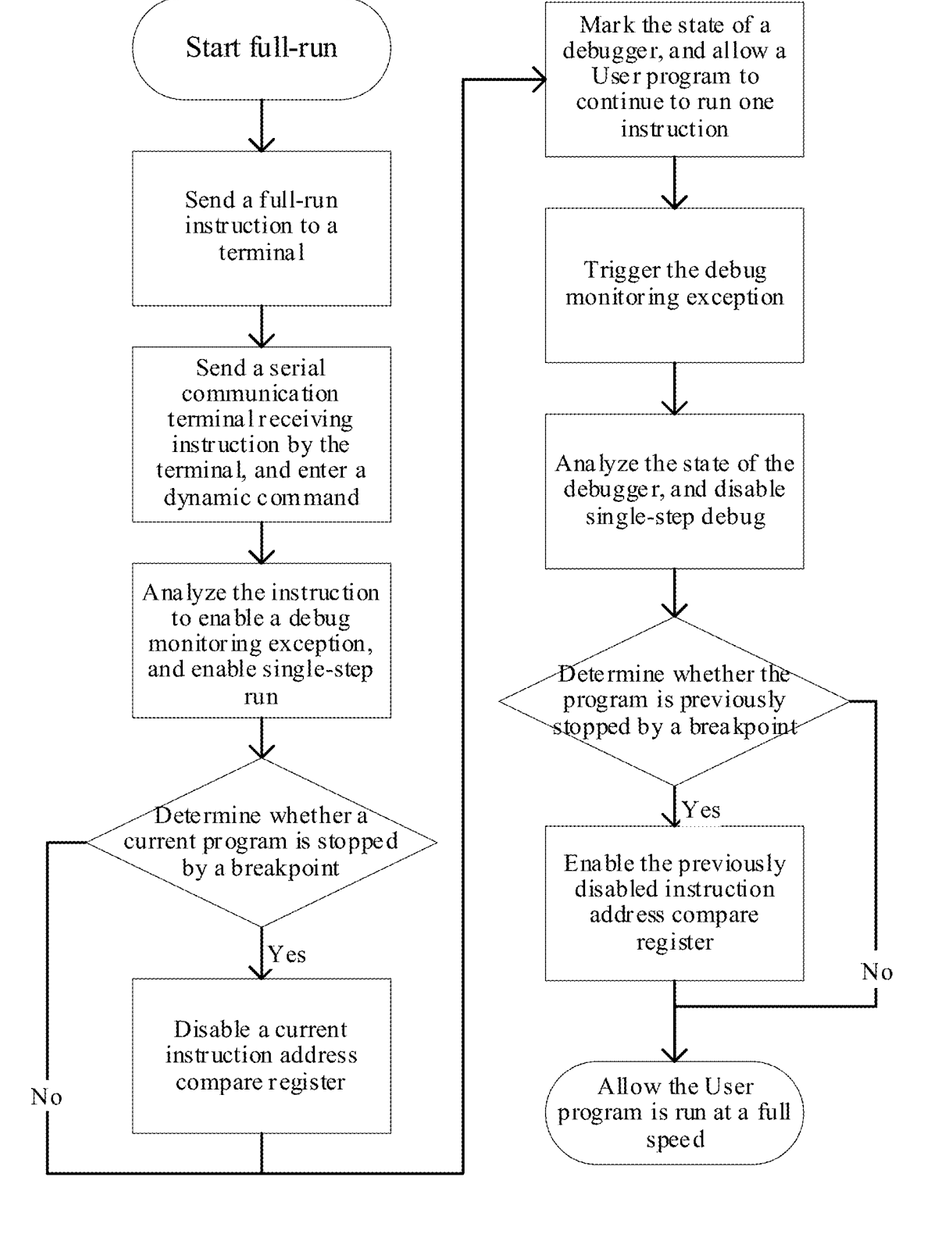
FIG. 1 is a flow diagram for setting a full-run state according to one implementation of the invention.

The program then resumes running; however, because the single-step execution has been initiated, the program will only execute a single instruction, then re-enter the debug monitor exception handler and disable the single-step execution according to the state of the current debugger. If the program is previously stopped by a breakpoint, the corresponding instruction address compare register will be enabled again. The program then will start to run at a full speed until the program encounters a next breakpoint or a suspend instruction, as shown in FIG. 1

2. Run-by-Statement

The run-by-statement mode is primarily based on single-step execution in the debug monitoring exception. The specific process is as follows: when the current program is suspended, the upper computer will issue a run-by-statement command; after receiving the run-by-statement command, the terminal will enable the debug monitoring exception and enable the single-step run; if the current program stops at a breakpoint, the current breakpoint will be disabled, and then the program continues to run one instruction and enter the debug monitoring exception again to disable the single-step run. If a breakpoint has been disabled previously, the breakpoint will be restored, and a breakpoint will be set at the position, where the current program stops, so as to stop the program and send corresponding register information to the upper computer, so that the upper computer is able to locate a code position corresponding to the current program with a specific address.

Wherein, the number of breakpoints may be excessive in the final step of setting breakpoints, which means that all the instruction address compare registers have been already in use before a breakpoint is set and no new instruction address compare register can be added. As the program will be definitely stopped at the current position next time, which means that none of the breakpoints in the existing instruction address compare registers will be triggered, the current address breakpoint will be set with the aid of an original instruction address compare register 0, and the contents of the original instruction address compare register 0 will be stored in a BPRegist variable in the reserved RAM space of the debugger, and will be restored when full-run is resumed.

3. Run-by-Process

In the absence of function calls, there is no difference between run-by-statement and run-by-process, so only the case where the current program stops at a function call will be discussed here: the upper computer issues a run-by-process command; and when receiving the run-by-process command, the terminal will determine whether the instruction at the position, where the current program stops, is a function call instruction; if so, the debug monitoring exception will be enabled, and single-step execution will also be enabled. After the program runs one instruction, that is, after the program enters the function to be called, the program will enter the debug monitoring exception again, a breakpoint will be set at a function return address with the aid of an R14 register of the hardware stack, then the single-step execution will be disabled, and the program will run at a full speed until the program hits the breakpoint previously set at the function return address, and then corresponding register information will be sent to the terminal. The case where the number of breakpoints is excessive when a breakpoint at the function return address is set is handled in the same way as the case in the run-by-statement mode.

4. Suspend

In case of a need to suspend the program immediately while it is running at the full speed, an instruction to suspend the program will be issued through the debugger. When receiving the suspend instruction, the terminal will immediately enable single-step execution, and then after the program continues to run one instruction and enters the debug monitoring exception again, the single-step execution will be disabled and the instruction address comparator will be set based on the program address that triggers the debug monitor exception, that is, a breakpoint will be set at the current position to stop the program. Here the case where the number of breakpoints is excessive is handled in the same way as the case in the run-by-statement mode.

General method for adaptive software debugging of communication modules

Software debugging can help developers trace and locate software problems to a great extent. The specific implementation of software debugging has been described above based on the BIOS framework and in combination with the most basic serial communication, but the serial communication is always limited by the transmission distance. In order to further realize remote software debugging of terminal programs and adapt to complex communication modules, a general method for adaptive software debugging of communication modules is given below.

As can be seen from the previous description, the communication modules are not overly represented during software debugging, but more as channels for receiving debugging instructions from the upper computer and sending back corresponding debugging information. Therefore, in case of porting between different communication modules in programs of the upper computer and the terminal, for information transmission during debugging, it is sufficient to change interfaces for sending and receiving corresponding information into sending and receiving functions of corresponding communication modules.

The program entry for software debugging should be also be taken into consideration. The software debugging program of the terminal is still essentially a subprogram of the dynamic command. After receiving a frame of data, the communication module still has to be parsed by the dynamic command to enter the corresponding software debugging branch. Therefore, the prerequisite for establishing software debugging functions for different communication modules is still to connect the current communication module to the dynamic command system, and then the dynamic command and the upper computer only need to agree on a data frame structure adapted to the debugging functions within the dynamic command so as to communicate with each other.

It can thus be seen that the "general method for adaptive software debugging of communication modules" introduced by "serial debugging" comprises the following steps:

(1) Dynamic command data is sent to the communication module and written by the User program.

(2) A system command for program jumping is sent to the communication module. The User program receives the command and jumps to BIOS.

(3) A dynamic command function is called by default during the BIOS starting process. Within the dynamic command, the program running state is firstly modified to complete a stay in BIOS; secondly, the initialization and interrupt enable of the communication module are completed; and the address of an interrupt service routine corresponding to the communication module in an interrupt vector table of the BIOS program is set as a dynamic command function; finally, the upper computer is informed that relevant initialization steps have been executed and a program update is to be started.

(4) The upper computer starts to send relevant instructions such as an instruction for enabling the debugging mode to the communication module to start a formal debug. After exiting from the debugging mode, interrupt vector tables of all programs will be restored and reset, and normal execution of the programs begins.

The main decision algorithm within the dynamic command is as follows.

| Algorithm 4-1 Decision algorithm within dynamic command for adaptive software debugging of communication Modules |
| --- |
| Input: Communication module interrupt state $S_o$ |
| Output: Program run state $S_p$ |
| 1:    if $S_o$ = Active then |
| 2:       Receive and process the communication module data and obtain the |
| 3:       current frame type T |
| 4:       clear $S_o$ |
| 5:       if T = Debug then |
| 6:          Parse data frames for debugging operations |
| 7:          $S_p \leftarrow$ Debug |
| 8:       else |
| 9:          Execute original communication module interrupt function |
| 10:       according to the current data frame |
| 11:          $S_p \leftarrow$ User |
| 12:       end if |
| 13:    else |
| 14:       Take over communication module interrupt |
| 15:       Redirect interrupt service routines to dynamic command |
| 16:       Initialize the communication module and interrupt enable |
| 17:       $S_p \leftarrow$ Ready |
|      end if |
|      return $S_p$ |

The above description is merely used to explain preferred specific implementations of the invention, and is not intended to limit the protection scope of the invention. All variations or substitutions easily obtained by any skilled in the art within the technical scope disclosed by the invention should fall within the protection scope of the invention. Thus, the protection scope of the invention should be subject to the protection scope of the appended claims.

What is claimed is:

1. A remote software debugging method for embedded terminals executing by a hardware processor to:

dynamically loading a software debugging program in a dynamic command system in a BIOS (basic input/output system) program, and providing a specific implementation of a necessary function for debugging within a dynamic command of the dynamic command system in the BIOS program;

completing relevant settings of a breakpoint of the dynamic command in a flash address reloading and breakpoint unit, and outputting corresponding debugging information within a debug monitoring exception responsible for capturing the breakpoint;

carrying out remote software debugging by running a full-run mode, a run-by-statement mode, a run-by-process mode and a suspend mode;

sending dynamic command data of the dynamic command to a communication module, and writing the dynamic command data of the dynamic command by a User program;

sending a system instruction for program jumping to the communication module, receiving the system instruction by the User program, and jumping to the BIOS program;

calling a dynamic command function by default during a BIOS startup process; modifying a running state of a program in the dynamic command first to complete a stay in the BIOS program; then, completing initialization and interrupt enable of the communication module; setting an interrupt service routine address, corresponding to the communication module, in a BIOS program interrupt vector table as the a dynamic command function; finally, informing an upper computer that relevant initialization has been finished and a program update is to be started; and sending a relevant instruction for enabling a debugging mode to the communication module by the upper computer to start a formal debug; and exiting from the debugging mode, then resuming interrupt vector tables of all programs, and starting normal execution of the all programs, wherein running the full-run mode to allow the program to resume running to execute an instruction; then, re-entering a debug monitoring exception handler; disabling a single-step execution in conjunction with a state of a current debugger; when the program is previously stopped by the breakpoint, re-enabling the corresponding instruction address compare register until program encounters a next breakpoint or a suspend instruction; and running the run-by-process mode to set a breakpoint at a function return address by an R14 register of a hardware stack, and disabling the single-step execution allowing the program to run at a full speed until the program hits the breakpoint set at the function return address; and after the program hits the breakpoint set at the function return address, sending corresponding register information to the terminal.

2. The remote software debugging method for embedded terminals according to claim 1, wherein:

the necessary function for debugging includes a debug monitoring exception interrupt processing function.

3. The remote software debugging method for embedded terminals according to claim 1, wherein:

sending the dynamic command and a debugging mode enable instruction;

modifying a User program interrupt vector table; and starting the User program.

4. The remote software debugging method for embedded terminals according to claim 1, further comprising returning the debugging information and exiting from the debugging mode.

5. The remote software debugging method for embedded terminals according to claim 1, wherein:

completing relevant settings of the breakpoint by the flash address reloading and breakpoint unit comprises:

analyzing an FPB (flash patch and breakpoint) control register;

analyzing an FPB instruction address compare register;

setting the breakpoint; and cancelling the breakpoint.

6. The remote software debugging method for embedded terminals according to claim 1, wherein:

the full-run mode further comprises:

when a terminal program is stopped, enabling the program to resume running at the upper computer through a full-run instruction until the program encounters a next breakpoint or a suspend instruction;

when the terminal program receives the full-run instruction, modifying a register to enable the debug monitoring exception, and enabling the single-step execution; then, determining whether the stop of the current program is triggered by a breakpoint or a suspend instruction; when the stop of the current program is triggered by the breakpoint, disabling a corresponding instruction address compare register, and marking the state of the current debugger.

7. The remote software debugging method for embedded terminals according to claim 1, wherein:

the run-by-statement mode comprises:

when a current program is suspended, issuing a run-by-statement command by the upper computer, and when a terminal receives the run-by-statement command, enabling the debug monitoring exception and enabling single-step run; when the current program stops at a breakpoint, disabling the current breakpoint, re-entering the debug monitoring exception after the program continues to run one instruction, and disabling the single-step run; and resuming a previously disabled breakpoint, and setting a breakpoint at a current program stop position to enable the program stop running and send corresponding register information to the upper computer, such that the upper computer is able to locate a code position corresponding to the current program in combination with a specific address.

8. The remote software debugging method for embedded terminals according to claim 1, wherein:

the run-by-process mode further comprises:

issuing a run-by-process command by the upper computer, and when a terminal receives the run-by-process command, determining whether an instruction at a current program stop position is a function call instruction; enabling the debug monitoring exception and enabling the single-step execution; after the program runs one instruction, namely after the program enters a function to be called, re-entering the debug monitoring exception.

9. The remote software debugging method for embedded terminals according to claim 1, wherein:

the suspend mode comprises: when a terminal receives a suspend instruction, enabling the single-step execution; re-entering the debug monitoring exception after the program continues to run one instruction, and then disabling the single-step execution; and setting an instruction address comparator according to an address of the program that currently triggers the debug monitoring exception, that is, setting a breakpoint at a current position to stop the program.

\* \* \* \* \*